United States Patent [19]
Cifuentes et al.

[11] Patent Number: 5,905,123
[45] Date of Patent: May 18, 1999

[54] MOISTURE-CURABLE HOT MELT SILICONE PRESSURE-SENSITIVE ADHESIVES

[75] Inventors: Martin Eric Cifuentes, Midland; William Patrick Brady, Sanford; Randall Gene Schmidt, Midland; William Joseph Schoenherr, Midland; Michael Raymond Strong, Midland; Bernard VanWert, Midland; Gary Allen Vincent, Midland, all of Mich.

[73] Assignee: Dow Corning Corporation, Midland, Mich.

[21] Appl. No.: 08/076,615

[22] Filed: Jun. 11, 1993

[51] Int. Cl.⁶ ..................................................... C08L 83/06
[52] U.S. Cl. .............................................................. 525/477
[58] Field of Search ............................................... 525/477

[56] References Cited

U.S. PATENT DOCUMENTS

| | | | |
|---|---|---|---|
| 4,143,088 | 3/1979 | Favre | 260/825 |
| 4,515,932 | 5/1985 | Chung | 528/16 |
| 4,753,977 | 6/1988 | Merrill | 524/588 |
| 4,831,070 | 5/1989 | McInally et al. | 524/267 |
| 4,865,920 | 9/1989 | Sweet | 428/447 |
| 4,882,377 | 11/1989 | Sweet | 524/267 |
| 5,013,781 | 5/1991 | Koshii et al. | 524/864 |
| 5,091,484 | 2/1992 | Colas | 525/477 |
| 5,096,981 | 3/1992 | Traver | 525/475 |
| 5,147,916 | 9/1992 | Sweet | 524/266 |
| 5,162,410 | 11/1992 | Sweet | 524/266 |
| 5,208,300 | 5/1993 | Krahnke | 525/474 |
| 5,210,156 | 5/1993 | Clark et al. | 525/477 |

FOREIGN PATENT DOCUMENTS

| | | |
|---|---|---|
| 5140458 | 11/1991 | Japan . |
| 481487 | 3/1992 | Japan . |

OTHER PUBLICATIONS

*Silicones*, Hardman et al. Reprinted from Encyclopedia of Polymer Science and Engineering, 1989.

*Primary Examiner*—Margaret W. Glass
*Attorney, Agent, or Firm*—Alex Weitz; Sharon K. Severance

[57] ABSTRACT

A moisture-curable silicone hot melt pressure-sensitive adhesive composition is disclosed, said composition comprising (i) a solid hydroxyl-functional organopolysiloxane resin comprising $R_3SiO_{1/2}$ siloxane units and $SiO_{4/2}$ siloxane units in a molar ratio of 0.5/1 to 1.2/1, respectively, wherein R is selected from hydrocarbon and halogenated hydrocarbon radicals and said hydroxyl content is 1.2 to 6 percent by weight;

(ii) an alkoxy-functional diorganopolysiloxane polymer having a viscosity at 25° C. of 20 to <100,000 centipoise, the weight ratio of said resin to said polymer being in the range 40:60 to 80:20;

(iii) a silane of the formula $R'_{4-y}SiX_y$, in which R' is selected from the group consisting of hydrocarbon radicals and substituted hydrocarbon radicals having 1–6 carbon atoms, X is a hydrolyzable group and y is 2 to 4, the amount of said silane being sufficient to provide stability to said composition; and (iv) sufficient catalyst to accelerate the cure of said composition, said composition being an essentially solvent-free, non-slump solid at room temperature which cures to an essentially non-tacky elastomer upon exposure to moisture.

21 Claims, No Drawings

MOISTURE-CURABLE HOT MELT SILICONE PRESSURE-SENSITIVE ADHESIVES

FIELD OF THE INVENTION

The present invention relates to a silicone pressure-sensitive adhesive composition. More particularly, the invention relates to a hot melt adhesive which cures upon exposure to ambient moisture.

BACKGROUND OF THE INVENTION

Silicone pressure-sensitive adhesives (hereinafter also referred to as PSAs) typically contain at least two primary components, namely a linear siloxane polymer and a tackifier resin consisting essentially of triorganosiloxane (M) units (i.e., $R_3SiO_{1/2}$ units, in which R denotes a monovalent organic group) and silicate (Q) units (i.e., $SiO_{4/2}$ units). In addition to the above two ingredients, silicone PSA compositions are generally provided with some crosslinking means (e.g., peroxide or hydrosilation cure systems) in order to optimize various properties of the final adhesive product. In view of the high viscosity imparted by the polymer component, these PSA compositions are typically dispersed in an organic solvent for ease of application.

U.S. Pat. No. 4,865,920 to Sweet describes solventless silicone PSAs that can be applied as a heated melt, also referred to as a hot melt. These compositions differ from prior art PSAs by replacement of the gum type polydiorganosiloxane with a liquid polydiorganosiloxane and by addition of from 1 to 10 percent, based on the combined weight of the organosilicon compounds, of a liquid ester of a monocarboxylic acid containing from 2 to 32 carbon atoms. Replacing this ester with a phenyl-containing polyorganosiloxane fluid to make the PSA more compatible with drugs and other organic materials is described in U.S. Pat. No. 5,162,410, also to Sweet. The hot melt PSAs described in both Sweet patents do not contain moisture reactive groups capable of forming a cured material, and therefore remain flowable at elevated temperatures and retain their tacky character.

A copending application, Ser. No. 07/748,478, filed on Aug. 22, 1991 (EP Publication 529841 A1) to Krahnke et al. describes silicone PSAs that cure in the presence of moisture to permanent adhesives. The compositions are particularly useful as structural adhesives for adhering glass panels to structural materials such as concrete, aluminum and steel. The two required ingredients of the PSA are an MQ resin and a high consistency polydiorganosiloxane gum. One or both ingredients of the PSA compositions described in this copending application contain moisture activated alkoxy curing groups. Due to the high viscosity of gum type polydiorganosiloxanes even at elevated temperatures, the compositions are not suitable for application as heated molten materials and are typically applied in solution form wherein the solvent is removed prior to curing of the composition or evaporates during the curing reaction.

Another moisture-curable PSA system is disclosed in Japanese laid open patent application (Kokai) No. 4(1992)/81,487. These PSAs comprise (1) 100 parts by weight of an MQ resin having a hydroxyl content of up to 0.7 weight percent, (2) a liquid polydiorganosiloxane containing hydrolyzable terminal groups and (3) a condensation catalyst to promote curing of the composition in the presence of moisture. The molar ratio of silanol groups in the resinous copolymer to hydrolyzable terminal groups in the liquid polydiorganosiloxane is from 1 to 10. A characterizing feature of these compositions is their ability to retain the characteristics of pressure sensitive adhesives under both dry and wet conditions following reaction of the moisture reactive groups.

U.S. Pat. No. 5,091,484 to Colas et al. describes elastomer-forming compositions containing (1) a hydroxyl- or alkoxy-terminated polydiorganosiloxane, (2) an alkoxy-functional MQ resin that is preferably liquid under ambient conditions and (3) a titanium-containing curing catalyst. These compositions are described as flowable under ambient conditions and cure in the presence of atmospheric moisture to yield elastomeric materials.

Moisture-curable compositions which cure to elastomers are also disclosed by Favre et al. in U.S. Pat. No. 4,143,088. These compositions are prepared by mixing (a) a hydroxyl-terminated polydiorganosiloxane, (b) an MQ resin, (c) an alkoxylated organosilicon compound and (d) an organic titanium derivative. Before being cured, these systems are liquids under ordinary conditions.

With the current emphasis on the control of volatile organic compound (VOC) emission, the use of conventional PSAs is losing favor and there is an ever growing need for PSAs which contain little or no solvent. Furthermore, many applications require that an essentially instant bond be formed between parts so that the parts can be transported or otherwise manipulated without waiting for a solvent to evaporate or the composition to cure. This characteristic is defined herein as "green strength" and is manifested by high initial adhesive strength of the PSA.

SUGARY OF THE INVENTION

The above noted needs are simultaneously addressed by the PSA compositions of the present invention, these compositions having a high level of instant tack and green strength and being essentially solvent-free. Additionally, these systems are non-slump solids under ambient conditions but can be heated to a flowable liquid state and applied as such to substrates by methods now employed to dispense hot melt organic adhesives. Further, the instant PSAs, which can be stored as one-part systems for extended periods, cure to essentially non-tacky elastomers when exposed to moisture, the cured composition providing an even stronger bond than its corresponding green strength value. Unlike compositions which remain PSAs after cure, the cured compositions of the present invention can be handled after curing and they exhibit limited dirt pick-up and contamination when an excess of the material overflows the intended bond area. Such contamination is undesirable from an aesthetic perspective as well as from performance considerations in electronic applications. Preferred hot melt PSAs of the invention additionally provide cured systems which show a surprisingly high adhesion at elevated temperatures.

The present invention therefore relates to a moisture-curable silicone hot melt pressure-sensitive adhesive composition comprising:

(i) a solid hydroxyl-functional organopolysiloxane resin comprising $R_3SiO_{1/2}$ siloxane units and $SiO_{4/2}$ siloxane units, wherein the mole ratio of the $R_3SiO_{1/2}$ siloxane units to $SiO_{4/2}$ siloxane units has a value of from 0.5/1 to 1.2/1, R is selected from the group consisting of hydrocarbon radicals and halogenated hydrocarbon radicals and said hydroxyl content is 1.2 to 6 percent by weight;

(ii) a diorganopolysiloxane polymer, each terminal group thereof containing at least two silicon-bonded alkoxy radicals having 1–4 carbon atoms, said polymer having a viscosity at 25° C. of 20 to <100,000 centipoise and the weight ratio of said resin to said polymer being in the range 40:60 to 80:20;

(iii) a silane of the formula $R'_{4-y}SiX_y$, in which R' is selected from the group consisting of hydrocarbon radicals and substituted hydrocarbon radical having 1–6 carbon atoms, X is a hydrolyzable group and y is 2 to 4, the amount of said silane being sufficient to provide stability to said composition; and (iv) sufficient catalyst to accelerate the cure of said composition, said composition being an essentially solvent-free non-slump solid at room temperature.

DETAILED DESCRIPTION OF THE INVENTION

Component (i) of the present invention is a soluble, hydroxyl-functional organopolysiloxane resin comprising $R_3SiO_{1/2}$ siloxane units and $SiO_{4/2}$ siloxane units. By the term soluble it is meant that the organopolysiloxane can be dissolved, substantially completely, in either a hydrocarbon liquid such as benzene, toluene, xylene, heptane and the like or in a silicone liquid such as cyclic or linear polydiorganosiloxanes. Preferably the resin is soluble in component (ii), delineated below.

In the formula for resin (i), R denotes a monovalent radical selected from the group consisting of hydrocarbon and halogenated hydrocarbon radicals, preferably having less than 20 carbon atoms, and most preferably having from 1 to 10 carbon atoms. Examples of suitable R radicals include alkyl radicals, such as methyl, ethyl, propyl, pentyl, octyl, undecyl and octadecyl; cycloaliphatic radicals, such as cyclohexyl; aryl radicals such as phenyl, tolyl, xylyl, benzyl, alpha-methyl styryl and 2-phenylethyl; alkenyl radicals such as vinyl; and chlorinated hydrocarbon radicals such as 3-chloropropyl and dichlorophenyl.

To enhance the solubility of component (i) in component (ii), described infra, it is desirable to select the predominant organic radicals of the former to match the predominant organic radicals of the latter. Preferably, at least one-third, and more preferably substantially all R radical in the formula for component (i), are methyl radicals. Examples of preferred $R_3SiO_{1/2}$ siloxane units include $Me_3SiO_{1/2}$, $PhMe_2SiO_{1/2}$ and $Ph_2MeSiO_{1/2}$ where Me hereinafter denotes methyl and Ph hereinafter denotes phenyl.

Component (i) includes a resinous portion wherein the $R_3SiO_{1/2}$ siloxane units (i.e., M units) are bonded to the $SiO_{4/2}$ siloxane units (i.e., Q units), each of which is bonded to at least one other $SiO_{4/2}$ siloxane unit. Some $SiO_{4/2}$ siloxane units are bonded to hydroxyl radicals resulting in $HOSiO_{3/2}$ units (i.e., TOH units), thereby accounting for the silicon-bonded hydroxyl content of the organopolysiloxane. In addition to the resinous portion, component (i) can contain a small amount of a low molecular weight material comprised substantially of a neopentamer organopolysiloxane having the formula $(R_3SiO)_4Si$, the latter material being a byproduct in the preparation of the resin according to the methods of Daudt et al., described infra.

For the purposes of the present invention, the ratio of $R_3SiO_{1/2}$ siloxane units to $SiO_{4/2}$ siloxane units has a molar ratio of 0.5 to 1.2, respectively. It is preferred that the mole ratio of the total M siloxane units to total Q siloxane units of (i) be between 0.6 and 0.8. The above M/Q mole ratios can be easily obtained by $^{29}Si$ nuclear magnetic resonance, this technique being capable of a quantitative determination of the molar contents of: M (resin), M (neopentamer), Q (resin), Q(neopentamer) and TOH. For the purposes of the present invention, as implicitly stated supra, the M/Q ratio {M(resin)+M(neopentamer)}/{Q(resin)+Q(neopentamer)} represents the ratio of the total number of triorganosiloxy groups of the resinous and neopentamer portions of (i) to the total number of silicate groups of the resinous and neopentamer portions of (i). It will, of course, be understood that the above definition of the M/Q mole ratio accounts for the neopentomer resulting from the preparation of resin (i) and not for any intentional addition of neopentomer.

Resin (i) of the instant invention must be a solid at room temperature. That is, it must have a softening point above ambient, preferably above 40° C. When this condition is not realized, the PSAs obtained do not exhibit the required non-slump character, as defined infra.

It is further preferred that the resinous portion of component (i) have a number average molecular weight ($M_n$) of about 1,500 to 15,000 when measured by gel permeation chromatography (GPC), the neopentamer peak being excluded from the measurement. In this molecular weight determination, narrow fractions of MQ resins are used to calibrate the GPC equipment, the absolute molecular weights of the fractions being first ascertained by a technique such as vapor phase osmometry. This molecular weight is preferably above about 3,000, most preferably 4,500 to 7,500, since the thermal hold of the resulting cured adhesive is significantly greater than when the $M_n$ is less than about 3,000. The term "thermal hold" is defined herein as the adhesive strength of the cured PSA at elevated temperatures (e.g., 150° C.).

Component (i) can be prepared by well known methods. It is preferably prepared by the silica hydrosol capping process of Daudt, et al., U.S. Pat. No. 2,676,182; as modified by Brady, U.S. Pat. No. 3,627,851; and Flannigan, U.S. Pat. No. 3,772,247; each patent being incorporated herein by reference to teach how to prepare soluble organopolysiloxane's which meet the requirements of the present invention. These methods employ an organic solvent, such as toluene or xylene, and provide a solution wherein the resin typically has a hydroxyl content of at least 1.2 percent (based on the weight of resin solids), this value preferably being 2.5 to 4.5 percent by weight (as determined by FTIR). The resulting resin is used in the instant compositions without further modification (e.g., without the need for a further processing step to reduce the hydroxyl level).

Component (ii) of the present invention is at least one diorganopolysiloxane polymer, each terminal group thereof containing at least two silicon-bonded alkoxy radicals having 1–4 carbon atoms. The repeat units of diorganopolysiloxane (ii) are $R_2SiO_{2/2}$ siloxy units wherein R is independently selected from the same hydrocarbon and halogenated hydrocarbon radicals delineated above for component (i). Component (ii) can comprise a single diorganopolysiloxane or a mixture of two or more different diorganopolysiloxanes. This polymer or polymer blend should have a viscosity at 25° C. of about 20 to <100,000 centipoise (cP), preferably 350 to 60,000 cP. It is preferred that at least 50%, and preferably at least 85%, of the organic radicals along the chain of component (ii) are methyl radicals, which radicals can be distributed in any manner in the diorganopolysiloxane. Further, component (ii) can comprise up to about 10 mole percent of siloxane branching sites provided it meets the above viscosity requirements. The side chains emanating from such branch points, of course, have terminal units which can also contain the above described alkoxy radicals.

The terminal units of diorganopolysiloxane (ii) are of the general alkoxy-functional form $R_a(R''O)_{3-a}SiG—$, wherein R is as defined above, R" is an alkyl radical having 1–4 carbon atoms, G represents a divalent group linking the silicon atom of the terminal unit with a silicon atom of the polymer chain and a is 0 or 1.

In the above formula, G represents any divalent group or atom which is not hydrolyzable and links the terminal alkoxy-functional units to the main chain of polymer (ii) such that this terminal unit is not removed during curing of the composition and the curing reaction is not adversely affected. Hydrolytically stable linkages represented by G includes but are not: limited to, oxygen, hydrocarbon, such as alkylene and phenylene, and hydrocarbon groups which contain one or more hetero atoms selected from oxygen, nitrogen and sulfur. Suitable structures for linking group G include —(OSiMe$_2$)CH$_2$CH$_2$—, —(CH$_2$ CH$_2$SiMe$_2$) (OSiMe$_2$)CH$_2$CH$_2$—, —(CH$_2$CH$_2$ SiMe$_2$)O—, —(CH$_2$CH$_2$SiMe$_2$)OSiMe$_2$)O—, —(CH$_2$CH$_2$SiMe$_2$) CH$_2$CH$_2$—, —CH$_2$CH$_2$—, —(OSiMe$_2$)O— and —O—. Specific examples of preferred terminal groups include, but are not limited to, (MeO)$_3$SiCH$_2$CH$_2$—, (MeO)$_3$SiO—, Me(MeO)$_2$SiO—, (EtO)$_3$SiO—, (MeO)$_3$ SiCH$_2$CH$_2$SiMe$_2$O— and (MeO)$_3$SiCH$_2$CH$_2$Si(Me$_2$)OSi (Me$_2$)CH$_2$CH$_2$—, inter alia, wherein Et hereinafter denotes an ethyl radical. The preparation of diorganopolysiloxane polymers having such terminal groups is described in detail in above cited application 748,478, hereby incorporated by reference to teach these preparative methods. Moisture reactive groups having the representative formulae (MeO)$_3$ SiO— and Me(MeO)$_2$SiO— can be introduced into a silanol-terminated diorganopolysiloxane by compounds having the formulae (MeO)$_4$Si and Me(MeO)$_3$Si, respectively, as is well known in the art.

Highly preferred diorganopolysiloxane (ii) of the invention is a polydimethylsiloxane which is terminated with groups having the structures (MeO)$_3$SiCH$_2$CH$_2$Si(Me$_2$)OSi (Me$_2$)CH$_2$CH$_2$—, (MeO)$_3$SiO— or Me(MeO)$_2$SiO—.

Silane (iii) of the present invention is represented by the formula R'$_{4-y}$SiX$_y$, in which R' is selected from the group consisting of hydrocarbon radicals and substituted hydrocarbon radicals having 1–6 carbon atoms. X in the above formula is a hydrolyzable group, preferably selected from alkoxy radicals having 1–4 carbon atoms, ketoxime radicals, acetamido, N-methylacetamido or acetoxy radicals and y is 2 to 4, preferably 3 to 4. The ketoxime groups are of the general form —ONC(R''')$_2$, in which each R''' independently represents an alkyl radical having 1–6 carbon atoms or a phenyl radical. Specific examples of preferred silanes include methyltrimethoxysilane, methyltriethoxysilane, propyltrimethoxysilane, tetramethoxysilane tetraethoxysilane, phenyltrimethoxysilane, isobutyltrimethoxysilane, methyl-tris(methylethylketoximo) silane and vinyl-tris(methylethylketoximo)silane, inter alia.

The catalyst (iv), which is used to accelerate the cure of the instant compositions upon exposure to moisture, may be selected from those compounds known in the art to promote the hydrolysis and subsequent condensation of alkoxy groups on silicon. Suitable curing catalysts include tin IV salts of carboxylic acids, such as dibutyltin dilaurate, and organotitanium compounds such as tetrabutyl titanate and partially chelated derivatives of these salts with chelating agents such as acetoacetic acid esters and beta-diketones.

Hot melt PSA compositions of the present invention can be obtained when the weight ratio of resin (i) to diorganopolysiloxane polymer (ii) is about 40:60 to 80:20, preferably 50:50 to 70:30 and most preferably 55:45 to 65:35. The precise ratio needed to form these systems can be ascertained for a given resin and polymer combination by routine experimentation based on the instant disclosure. When this ratio is below about 40:60, the compositions are fluids which do not exhibit non-slump character; when this ratio is above about 80:20, the compositions exhibit an increased tendency to produce embrittled materials upon cure (i.e., they do not form elastomers). By "non-slump" it is meant that the material appears to be a solid such that, when a 60 cc jar is filled to about one third capacity with the material and tipped on its side at room temperature (i.e., about 25° C.), essentially no flow is observed within a 20 minute period. This corresponds to a minimum room temperature dynamic viscosity in the approximate range $2\times10^7$ to $8\times10^7$ cP when measured at 1 radian/sec. The hot melt compositions of the invention flow at elevated temperatures and can readily be extruded from a conventional hot melt gun (e.g., the dynamic viscosity is preferably of the order $10^4$ cP at $\leq 200°$ C.).

Silane (iii) is employed in the instant compositions at a level sufficient to provide stability to said composition. Thus, even though compositions employing alkoxyfunctional polymers can cure and otherwise fit the general parameters of the present invention, a small amount of silane is required to impart stability to the composition so that it can be stored for a reasonable period, such as several months, without forming gels. It has been found that, when silane (iii) is an alkoxy-functional silane, the molar ratio of silane to hydroxyl functionality on resin (i) should be at least 0.1, preferably about 0.8–2.5. When silane (iii) is a ketoxime, acetamido, N-methylacetamido or acetoxyfunctional silane, the mole ratio of silane to hydroxyl functionality on resin (i) should be at least 0.3, preferably about 0.6–1.5. When a hydroxyl-functional polydiorganosiloxane is capped with alkoxy functionality in an in-situ process, described infra, it will be understood that the amount of silane (iii) to be added is an excess beyond that amount of alkoxy-functional silane needed to cap all the hydroxyl functionality.

Finally, a sufficient quantity of catalyst (iv) is added to accelerate the cure of the PSA composition. This amount can readily be determined by the skilled artisan through routine experimentation and is typically about 0.01 to 3 percent based on the combined weight of the resin and polymer solids.

The order of addition of the components of the present invention has considerable influence on the final properties of the resulting PSA composition. In a preferred procedure, an alkoxy-functional polydiorganosiloxane (ii) of the invention is mixed with an organic solvent solution of resin (i), at least a portion of silane (iii) and, preferably, a portion of catalyst (iv). The solvent employed is preferably the one used to prepare the resin component, as described supra. This mixture is reacted (e.g., at a temperature of 20–110° C. for a period of about 1–24 hours) and the solvent then stripped off to provide an essentially solvent-free composition. The remaining portions of silane and catalyst are then added to this stripped product. The above mentioned stripping (devolatilization) can be effectively accomplished by heating the mixture under vacuum, for example at 90° C. to 150° C. and <10 millimeters of mercury in a batch operation. The removal of solvent can also be accomplished by any of the known techniques, such as contact with a stream of inert gas, evaporation, distillation, thin film stripping, and the like. Excessively high temperatures should be avoided when all the components are being devolatilized. A temperature of 200°° C., and preferably 150° C., should not be exceeded.

An alkoxy-functional polydiorganosiloxane can be prepared from a hydroxyl-functional polydiorganosiloxane by reacting the latter with an alkoxy-functional silane. This reaction is typically conducted in the presence of a suitable catalyst such as an alkyl titanate. Heating of the mixture may be required for the reaction to proceed at a useful rate. Alternatively, a hydroxyl-functional diorganopolysiloxane can be capped in-situ by reacting it with an alkoxysilane in the presence of a solution of resin (i) and, preferably, also in the presence of a catalyst such as stannous octoate, a base or tetrabutyltitanate. When the catalyst of the above described in-situ process is an $Sn^{II}$ salt, the catalyst is de-activated by an appropriate agent before stripping off the solvent. Likewise, when the in-situ catalyst is a base, such as potassium carbonate, this base is neutralized before the solvent is stripped off. After the devolatilization step, catalyst (iv) is added to complete the preparation.

It is, of course, understood that the above procedures are to be carried out in the absence of moisture in order to prevent premature curing of the compositions. This also applies to subsequent storage of the compositions.

In general, small amounts of additional ingredients may be added to the compositions of this invention. For example, antioxidants, pigments, stabilizers, fillers, etc., may be added as long as they do not materially alter the requirements stipulated herein.

Hot melt PSA compositions according to the instant invention may be applied to various substrates by techniques currently employed for dispensing organic hot melt formulations (e.g., hot melt gun, spraying, extrusion, spreading via heated draw-down bars, doctor blades or calendar rolls). The common factor in these methods is that the composition is heated to a temperature sufficient to induce flow before application. Upon cooling to ambient conditions, the compositions of the present invention are tacky, non-slump PSAs which may be used to bond components or substrates to one another. Alternatively, the bonding can take place while the adhesive is still hot, but the latter will not, of course, support much stress under these conditions and the bonded parts would have to be held in place until the PSA cooled. After the desired components are bonded with the PSA of the invention, the combination is exposed to ambient air so as to cure the PSA to an essentially non-tacky elastomer. Essentially tack-free herein indicates that the surface does not exhibit a measurable degree of tack and feels dry or nearly dry to the touch. The time required for completion of this cure process ranges from about a day to more than a month, depending upon the catalyst: type, catalyst level, temperature and humidity, inter alia. As a result of this cure, the adhesive strength of the instant compositions is greatly augmented.

The compositions of this invention find utility in many of the same applications as now being served by silicone PSAs and/or organic hot melt adhesives, particularly in such industries as automotive, electronic, construction, space and medical. In these areas of application, the instant PSAs provide bonds which are resistant to hostile environments, such as heat and moisture.

EXAMPLES

The following examples are presented to further illustrate the compositions of this invention, but are not to be construed as limiting the invention, which is delineated in the appended claims. All parts and percentages in the examples are on a weight basis and all measurements were obtained at 25° C., unless indicated to the contrary.

The following components, listed alphabetically for ease of reference, were used in the examples.

Fluid A=trimethoxysiloxy-capped polydimethylsiloxane fluid having a degree of polymerization of about 400 and a viscosity of about 2,000 cP.

Fluid B=hydroxyl-ended polydimethylsiloxane fluid having a degree of polymerization of about 400 and a viscosity of about 2,000 cP.

Fluid C=hydroxyl-ended polydimethylsiloxane fluid having a degree of polymerization of about 40 and a viscosity of about 70 cP.

Fluid D=triethoxysiloxy-capped polydimethylsiloxane fluid having a degree of polymerization of about 400 and a viscosity of about 2,000 cP.

Fluid E=methyldimethoxysiloxy-capped polydimethylsiloxane fluid having a degree of polymerization of about 870 and a viscosity of about 11,000 cP.

Fluid F=a polydimethylsiloxane fluid terminated with units of the formula $—CH_2CH_2Si(Me)_2OSi(Me)_2CH_2CH_2Si(OMe)_3$, wherein Me hereinafter denotes a methyl radical, said fluid having a viscosity of about 2000 cP.

Fluid G=a methyldimethoxysiloxy-capped polydimethylsiloxane fluid having a viscosity of about 52 cP.

Fluid H=a methyldimethoxysiloxy-capped polydimethylsiloxane fluid having a degree of polymerization of about 400 and a viscosity of about 2,000 cP.

IBTMS=isobutyltrimethoxysilane.

MTM=methyltrimethoxysilane.

MTO=methyl-tris(methylethylketoximo)silane of the formula $MeSi(ON=C(Et)Me)_3$, in which Et denotes an ethyl radical.

Resin 1=a 72% solution in xylene of a solid MQ resin consisting essentially of trimethylsiloxy units and $SiO_{4/2}$ unit in a molar ratio of about 0.63:1 and having a silicon-bonded hydroxyl content of about 3.7 weight percent and a number average molecular weight ($M_n$) of about 5,000.

Resin 2=a 62% solution in xylene of Resin 1 wherein the resin has been capped with trimethylsiloxy groups so as to provide a residual silicon-bonded hydroxyl content of about 0.8 weight percent.

Resin 3=an 81% solution in xylene of a solid MQ resin consisting essentially of trimethylsiloxy units and $SiO_{4/2}$ unit in a molar ratio of about 1.1:1 and having a silicon-bonded hydroxyl content of about 3.2 weight percent and $M_n$ of about 2,700.

TBT=tetra n-butyl titanate.

TDIDE=2,5-di-isopropoxy-bis(ethylacetate) titanium.

TEOS=tetraethoxysilane.

The number average molecular weight of the above described resins was determined by gel-permeation chromatography (GPC) using Varian TSK 4000+2500 columns at 35° C., a chloroform mobile phase at 1 mL/min and an IR detector set at 9.1 microns to detect Si—O—Si. The GPC was calibrated using narrow fractions of similar resins as standards. The $M_n$ values reported herein exclude any neopentamer, $(Me_3SiO)_4Si$, present in the resin component.

The trimethylsiloxy/$SiO_{4/2}$ ratio of the resins was determined by $^{29}Si$ nmr and, in this case, the reported results include any neopentamer component present in the resin.

Adhesion Testing

Adhesive strength of PSA compositions was determined as a function of cure time under ambient conditions using a plastic box construction. The box construction comprised four integrally-formed side walls and a detachable, form-fitting bottom plate. The box had a generally rectangular cross-section measuring 3.5 cm wide×6 cm long, had a wall height of 1.5 cm and had a wall thickness of 5 mm. Each side wall had a 3 mm wide recessed step along its bottom interior edge for receiving said bottom plate such that the exterior surface of the latter was flush with said edges when seated on said step.

In a typical adhesion evaluation, the plate was detached and a thin bead of molten PSA was extruded from a heated metal cartridge (approximately 150° C.) along the 3 mm wide step. The bottom plate was pressed into place so as to contact the adhesive on the step and thereby provide a box having an open top. The box additionally had external protrusions in two of its opposite walls which allowed it to be constrained in a special jig while the bottom plate was pushed out with the ram of an arbor press apparatus, the apparatus having been modified to measure the applied force. The force necessary to push the bottom plate out of the wall section was recorded and the test repeated on identical box constructions at various storage times at ambient conditions to asses adhesion and its improvement with cure.

EXAMPLE 1

Fluid A (26.6 g), 16.2 g of phenyltrimethoxysilane, 0.35 g of TBT, and 60.2 g of Resin 1 were thoroughly mixed in a 3-necked reaction flask. The resulting mixture was devolatilized at reduced pressure (<10 mm Hg) as the temperature was increased to 130° C. This temperature was maintained for an additional 15 minutes. Once devolatilized, the system was restored to atmospheric pressure using dry nitrogen gas. Additional TBT was introduced (3.85 g of a 10% solution in MTM) and dispersed in the molten product. The resin/polymer ratio of this composition was 62/38 and the molar ratio of silane to resin silanol was 0.9. This composition was transferred to a clean metal cartridge, applied to box constructions and tested, as described above.

| Test Time | Force |
|---|---|
| 20 min | 35 lb |
| 1 hr | 39 lb |
| 4 hr | 57 lb |
| 7 days | 146 lb |

EXAMPLE 2

Fluid A (76.0 g), 47.6 g of IBTMS, 1.04 g of TBT and 172.0 g of Resin 1 were thoroughly mixed in a 3-necked reaction flask. The resulting mixture was heated and maintained at 60° C. for 45 minutes and thereafter devolatilized as described in Example 1. The system was then restored to atmospheric pressure using dry nitrogen gas. Additional TBT (7.0 g of a 14.3% solution in MTM) was dispersed in the molten product. The resin/polymer ratio of this composition was 62/38 and the molar ratio of silane to resin silanol was 1.0. This composition was transferred to a metal cartridge and applied to boxes and tested, as described above:

| Test Time | Force |
|---|---|
| 1 min | 34 lb |
| 1 hr | 50 lb |
| 4 hr | 48 lb |
| 24 hr | 112 lb |
| 7 days | 198 lb |

EXAMPLE 3

This example illustrates a composition of the invention wherein two different hydroxyl-functional fluids were capped by an in-situ process.

A reaction flask was charged with 133.1 g of Resin 1, 45.8 g of TEOS, 29.9 g of MTM, 16 g of Fluid B, 48 g of Fluid C and 0.0016 g of potassium carbonate. This combination was mixed and reacted at 115° C. for 24 hours, whereupon 0.48 g of 1,1,1-trichloro-2-methyl-2-propanol, 0.5-hydrate (to neutralize the potassium carbonate) was mixed in for an additional 30 minutes at 115° C. The resulting mixture was then filtered to remove particulates and potassium salts, and recovered in a glass container. A portion of this product (99.7 g) was devolatilized as in Example 1 and 0.34 g of TBT was dispersed in the molten product. The resin/polymer ratio of this composition was 60/40. The material was then transferred to a metal cartridge and tested as before.

| Test Time | Force |
|---|---|
| 20 min | 33 lb |
| 4 hr | 48 lb |
| 1 day | 72 lb |
| 7 days | 89 lb |

EXAMPLE 4

Resin 1 (61.6 g) was thoroughly blended with 9.96 g of TEOS and 25.21 g of Fluid D and this mixture was heated to 110° C. This combination was reacted for one hour using 0.18 g of stannous octoate catalyst, whereupon 0.18 g of mercaptopropyltrimethoxysilane was then mixed in to de-activate the tin catalyst. The pressure of the system was reduced (2 mm Hg) and the reaction mixture was stripped up to a temperature of 150° C., whereupon 0.35 g of TDIDE was dispersed in the mixture. The resin/polymer ratio of this composition was 64/36 and the molar ratio of silane to resin silanol was 0.5. The product was recovered and tested as previously described:

| Test Time | Force |
|---|---|
| 2 min | 56 lb |
| 25 min | 53 lb |
| 1 hr | 60 lb |
| 7 days | 220 lb |

The box constructions which had been tested after 2 minutes, 25 minutes and 1 hour were pressed back together immediately after these tests and re-tested after being exposed to ambient air for an additional 7 days. The adhesive strengths shown below for these samples illustrate the long "open times" provided by the compositions of the invention. As used herein, open time denotes the time that the composition retains its PSA character (i.e., does not cure to an appreciable degree) under ambient conditions.

| | TIME OF INITIAL TEST | FORCE AFTER 7 DAY RE-TEST |
|---|---|---|
| Sample 1 | 2 min | 180 lb |
| Sample 2 | 25 min | 160 lb |
| Sample 3 | 1 hour | 140 lb |

EXAMPLE 5

Fluid D (21.2 g) was thoroughly mixed with 11.9 g of phenyltrimethoxysilane and 0.26 g TBT and 44.1 g of Resin 1 was added thereto. The resulting mixture was heated and maintained at 60° C. for approximately one hour, whereupon the mixture was devolatilized at reduced pressure (<10 mm Hg) as the temperature was raised to 150° C. As before, nitrogen was introduced to break the vacuum and 0.26 g of TDIDE was dispersed in the molten product. The resin/polymer ratio of this composition was 60/40 and the molar ratio of silane to resin silanol was 0.88. The PSA so formed was then transferred to a metal cartridge and tested as before:

| Test Time | Force |
|---|---|
| 20 min | 28 lb |
| 1 hr | 32 lb |
| 5 hr | 48 lb |
| 24 hr | 92 lb |
| 7 days | 155 lb |

EXAMPLE 6

A reaction flask was charged with 133.1 g of Resin 1, 45.8 g of TEOS, 29.9 g of MTM, 16 g of Fluid B, 48 g of Fluid C and 0.008 g of potassium carbonate. This mixture was heated and maintained at 115° C. for 2.5 hours, which heating was followed by the addition of 0.2 g of 1,1,1-trichloro-2-methyl-2-propanol, 0.5-hydrate and additional mixing for 30 minutes at 115° C. The product was allowed to cool to room temperature and transferred to a glass container. The product (112.5 g) was devolatilized as described in Example 3 and 0.38 g of TBT was dispersed therein. The resin/polymer ratio of this composition was 60/40.

The stripped PSA was recovered in a metal cartridge and tested as before:

| Test Time | Force |
|---|---|
| 20 min | 37 lb |
| 1 hr | 43 lb |
| 4 hr | 57 lb |
| 1 day | 56 lb |
| 7 days | 64 lb |

EXAMPLE 7

Resin 3 (60.4 g), 33.0 g of TEOS, 14.0 g of Fluid E and 0.35 g of TBT were mixed and then devolatilized at approximately 2 mm Hg/150° C. The resin/polymer ratio of this composition was 80/20 and the molar ratio of silane to resin silanol was 1.5. The devolatilized mixture was then recovered and tested as described above:

| Test Time | Force |
|---|---|
| 20 min | 66 lb |
| 1 hr | 86 lb |
| 4 hr | 80 lb |
| 3 days | 98 lb |

EXAMPLE 8

Resin 1 (86.0 g) was thoroughly mixed with 23.8 g of IBTMS and 38.0 g of Fluid F. Approximately 0.5 g of TBT was then dispersed in this mixture and the contents were heated and maintained at about 60° C. for approximately one hour. The mixture was then devolatilized as in Example 1 and 3.1 g of a 14% TBT solution in MTM was dispersed in the molten product. The resin/polymer ratio of this composition was 62/38 and the molar ratio of silane to resin silanol was 1.0. The material was recovered in a metal cartridge and tested as before:

| Test Time | Force |
|---|---|
| 10 sec | 30 lb |
| 1 hr | 60 lb |
| 24 hr | 134 lb |

All of the above PSAs of the instant invention were non-slumping solids at 25° C. and could be readily extruded at about 150° C. from a hot-melt gun. All these compositions cured to non-tacky elastomers upon exposure to ambient moist air.

(COMPARATIVE) EXAMPLE 1

Resin 2 (67.4 g) was thoroughly mixed with 28 g of Fluid D and this mixture was devolatilized at reduced pressure (<10 mm Hg) up to a temperature of 150° C. After breaking the vacuum with nitrogen gas, 0.2 g of TBT was dispersed in the molten product to provide a PSA having a resin/polymer ratio of 60/40. The material was then recovered and in a metal cartridge and tested as before:

| Test Time | Force |
|---|---|
| 20 min | 25 lb |
| 1 hr | 29 lb |
| 5 hr | 64 lb |
| 24 hr | 84 lb |
| 7 days | 97 lb |

Although the adhesion of this non-slump system was acceptable, capping the resin represents an extra step in the formulation of the PSA. Moreover, the cured system retained some tack even after being cured at ambient condition, unlike the compositions of the present invention.

(COMPARATIVE) EXAMPLE 2

A series of compositions were prepared according to the disclosure of Japanese Patent Application 4 (1992)-81487, cited supra, wherein the low silanol resin was replaced with Resin 1 of the instant invention. The polymer used in this series was Fluid A and the molar ratio of SiOH of the resin to hydrolyzable group on silicon employed is shown in Table 1. Dibutyltin dimethoxide was added to each formulation at a 0.1% level based on solids content. Upon addition of the tin catalyst, white gel particulates immediately began to precipitate from solution and these could not be re-dispersed.

This example shows that it is not possible to directly substitute an uncapped resin of the instant invention for the capped resin taught by the Japanese Application. Moreover, when this experiment was repeated using capped resin (Resin 2) at a resin to polymer ratio of 60/40, the resulting stripped product remained a PSA when cured, in contrast to the compositions of the present invention which cure to non-tacky elastomers.

TABLE 1

| SAMPLE | RESIN 1 | FLUID A | SiOH/OMe |
|---|---|---|---|
| Sample 1 | 11.9 g | 23.1 g | 5.0 mol/mol |
| Sample 2 | 15.2 | 19.8 | 7.5 |

TABLE 1-continued

| SAMPLE | RESIN 1 | FLUID A | SiOH/OMe |
|---|---|---|---|
| Sample 3 | 16.8 | 18.2 | 9.0 |
| Sample 4 | 17.7 | 17.3 | 10.0 |

(COMPARATIVE) EXAMPLE 3

This example differentiates the instant PSA compositions from those disclosed in copending application Ser. No. 07/748,478, cited supra.

A pre-mix of 0.13 g of TBT in 33.42 g of MTM was dispersed in a mixture of 180.1 g of a 26.2% solution of a hydroxyl-terminated polydimethylsiloxane gum (plasticity= 37.5 mils=0.95 mm as determined by ASTM 926) in xylene and 72.48 g of Resin 3. The mixture was heated and maintained at 60° C. for 3 hours and then stripped at reduced pressure (<10 mm Hg) and 90° C. to provide a PSA having a resin/polymer ratio of 55/45 wherein the molar ratio of silane to resin silanol was 2.2. The devolatilized material was then transferred to a metal cartridge and tested as before:

| Test Time | Force |
|---|---|
| 1 hr | 5 lb |
| 4 hr | 5 lb |
| 24 hr | 20 lb |
| 48 hr | 10 lb |
| 5 days | 16 lb |

This example illustrates that such compositions which employ a high molecular weight gum as the polymer component of the PSA do did not provide the high adhesion values, particularly at short contact time, which were obtained for compositions of the present invention.

Box constructions laminated with the PSAs shown in Table 2 were placed in a 150° C. oven after each system had cured to its ultimate bonding strength (about two to four weeks at ambient conditions as determined by separate experiments). Each of these samples was removed from the oven after 30 minutes and immediately tested for push out force according to the above describe method. The results are presented in Table 2.

TABLE 2

| Adhesive | Adhesive Strength (150° C.) |
|---|---|
| Example 4 | 90 lb |
| Example 5 | 56 lb |
| Example 7 | ≈0 (not measurable) |
| (Comparative) Example 1 | 9 lb |

From Table 2 it can be seen that when the $M_n$ of the resin component of the instant compositions is greater than about 3,000 (Examples 4 and 5) the adhesive strength at elevated temperatures, herein referred to as thermal hold, is greatly increased relative to formulations wherein the resin has an $M_n$ below this value (Example 7). Further, the thermal hold value is also significantly diminished when the resin is capped with a non-reactive moiety, as in the case of (Comparatives) Example 1.

To illustrate the stabilizing effect of the silane component of the present invention, the following experiment was carried out.

Fluid G (22.5 g) was thoroughly mixed with 38.1 g of Resin 1. To 5 g aliquots of this solution sufficient TEOS was added to produce silane/SiOH molar ratios shown in Table 3. One drop of TBT was added to each solution followed by mixing overnight at room temperature. The resultant solutions were stored at room temperature and monitored for changes in viscosity and ultimate gelation, the results being presented in Table 3.

TABLE 3

| SAMPLE | TEOS/SiOH MOLAR RATIO | DAYS TO GEL |
|---|---|---|
| A | 0.0 | <6 |
| B | 0.01 | 17–24 |
| C | 0.02 | 24–48 |
| D | 0.05 | 24–48 |
| E | 0.1 | >48 |

The above experiment was repeated to illustrate effectiveness of a different silane (MTO) in providing stability to the instant systems, the results being shown in Table 4.

TABLE 4

| SAMPLE | MTO/SiOH MOLAR RATIO | DAYS TO GEL |
|---|---|---|
| F | 0.0 | <6 |
| G | 0.01 | 3–10 |
| H | 0.02 | 3–10 |
| I | 0.05 | 3–10 |
| J | 0.1 | 10–34 |
| K | 0.2 | 10–34 |
| L | 0.3 | >34 (clear, one-phase, fluid) |
| M | 0.4 | >34 (clear, one-phase, fluid) |

Another similar series was run to illustrate the influence of fluid molecular weight on stability of the resin/fluid blends.

The above examples demonstrate that, even though compositions based on alkoxy-functional fluid do cure, the stability of these compositions is inadequate unless some additional silane of the invention is incorporated therein.

That which is claimed is:

1. A moisture-curable silicone hot melt pressure-sensitive adhesive composition comprising:
   (i) a solid hydroxyl-functional organopolysiloxane resin comprising $R_3SiO_{1/2}$ siloxane units and $SiO_{4/2}$ siloxane units, wherein the mole ratio of the $R_3SiO_{1/2}$ siloxane units to $SiO_{4/2}$ siloxane units has a value of from 0.5/1 to 1.2/1, R is selected from the group consisting of hydrocarbon radicals and halogenated hydrocarbon radicals and said hydroxyl content is 1.2 to 6 percent by weight;
   (ii) a diorganopolysiloxane polymer, each terminal group thereof containing at least two silicon-bonded alkoxy radicals having 1–4 carbon atoms, said polymer having a viscosity at 25° C. of 20 to <100,000 centipoise, and the weight ratio of said resin to said polymer being in the range 40:60 to 80:20;
   (iii) a silane of the formula $R'_{4-y}SiX_y$, in which R' is selected from the group consisting of hydrocarbon radicals and substituted hydrocarbon radicals having 1–6 carbon atoms, X is a hydrolyzable group and y is 2 to 4, the amount of said silane being sufficient to provide stability to said composition; and
   (iv) sufficient catalyst to accelerate the cure of said composition, said composition being an essentially solvent-free, non-slump solid at room temperature which cures to an essentially non-tacky elastomer upon exposure to moisture.

2. The composition according to claim 1, wherein R of said resin (i) is methyl and said polydiorganosiloxane (ii) is polydimethylsiloxane.

3. The composition according to claim 2, wherein X of said silane (iii) is an alkoxy radical having 1 to 2 carbon atoms.

4. The composition according to claim 3, wherein the terminal groups of said polydiorganosiloxane (ii) are selected from the group consisting of the structures $(MeO)_3SiO$—, $Me(MeO)_2SiO$—, $(MeO)_3SiCH_2CH_2SiMe_2O$— and —$CH_2CH_2Si(Me)_2OSi(Me)_2CH_2CH_2Si(OMe)_3$, in which Me denotes a methyl radical.

5. The composition according to claim 4, wherein the weight ratio of said resin (i) to said polydiorganosiloxane (ii) is 50/50 to 70/30 and the viscosity of said polydiorganosiloxane (ii) is 350 to 60,000 cP at 25° C.

6. The composition according to claim 5, wherein the amount of said silane (iii) used is sufficient to provide a molar ratio of said silane to the hydroxyl functionality on said resin (i) of 0.8 to 2.5.

7. The composition according to claim 6, wherein the number average molecular weight of said resin (i) is 3,000 to 15,000 and the hydroxyl content of said resin (i) is 2.5 to 4.5 percent by weight.

8. The composition according to claim 7, wherein said silane (iii) is selected from the group consisting of isobutyltrimethoxysilane, methyltrimethoxysilane, phenyltrimethoxysilane, propyltrimethoxysilane, tetramethoxysilane and tetraethoxysilane.

9. The composition according to claim 7, wherein the weight ratio of said resin (i) to said polydiorganosiloxane (ii) is 55/45 to 65/35.

10. The composition according to claim 2, wherein X of said silane (iii) is selected from the group consisting of an acetoxy radical, acetamido, N-methylacetamido and a ketoxime group.

11. The composition according to claim 10, wherein the terminal groups of said polydiorganosiloxane (ii) are selected from the group consisting of the structures $(MeO)_3SiO$—, $Me(MeO)_2SiO$—, $(MeO)_3SiCH_2CH_2SiMe_2O$— and —$CH_2CH_2Si(Me)_2OSi(Me)_2CH_2CH_2Si(OMe)_3$, in which Me denotes a methyl radical.

12. The composition according to claim 11, wherein the weight ratio of said resin (i) to said polydiorganosiloxane (ii) is 50/50 to 70/30 and the viscosity of said polydiorganosiloxane (ii) is 350 to 60,000 cP at 25° C.

13. The composition according to claim 12, wherein the amount of said silane (iii) used is sufficient to provide a molar ratio of said silane to the hydroxyl functionality on said resin (i) of 0.6 to 1.5.

14. The composition according to claim 13, wherein the number average molecular weight of said resin (i) is 3,000 to 15,000 and the hydroxyl content of said resin (i) is 2.5 to 4.5 percent by weight.

15. The composition according to claim 14, wherein said silane (iii) is selected from the group consisting of methyl-tris(methylethylketoximo)silane and vinyl-tris(methylethylketoximo)silane.

16. The composition according to claim 14, wherein the weight ratio of said resin (i) to said polydiorganosiloxane (ii) is 55/45 to 65/35.

17. The composition according to claim 1, wherein the weight ratio of said resin (i) to said polydiorganosiloxane (ii) is 55/45 to 65/35.

18. The composition according to claim 2, wherein the weight ratio of said resin (i) to said polydiorganosiloxane (ii) is 55/45 to 65/35.

19. The composition according to claim 4, wherein the weight ratio of said resin (i) to said polydiorganosiloxane (ii) is 55/45 to 65/35.

20. The composition according to claim 11, wherein the weight ratio of said resin (i) to said polydiorganosiloxane (ii) is 55/45 to 65/35.

21. The composition according to claim 8, wherein said silane (iii) is phenyltrimethoxysilane.

* * * * *